United States Patent
Cooper et al.

(10) Patent No.: US 10,075,386 B2
(45) Date of Patent: Sep. 11, 2018

(54) SUBSCRIPTION-BASED INFORMATION SYSTEM

(71) Applicant: ADP, LLC, Roseland, NJ (US)

(72) Inventors: Thomas A. Cooper, Sutton, MA (US); Timothy Downey, Leominster, MA (US)

(73) Assignee: ADP, LLC, Roseland, NJ (US)

( * ) Notice: Subject to any disclaimer, the term of this patent is extended or adjusted under 35 U.S.C. 154(b) by 518 days.

(21) Appl. No.: 14/707,323

(22) Filed: May 8, 2015

(65) Prior Publication Data
US 2016/0330129 A1    Nov. 10, 2016

(51) Int. Cl.
| | |
|---|---|
| G06F 15/16 | (2006.01) |
| H04L 12/911 | (2013.01) |
| H04L 29/08 | (2006.01) |
| G06F 17/30 | (2006.01) |
| H04L 12/58 | (2006.01) |

(52) U.S. Cl.
CPC ........ *H04L 47/70* (2013.01); *G06F 17/30569* (2013.01); *H04L 67/28* (2013.01); *H04L 67/2838* (2013.01); *H04L 51/00* (2013.01)

(58) Field of Classification Search
CPC ..... H04L 47/70; H04L 67/28; H04L 67/2838; H04L 51/00; G06F 17/30569
See application file for complete search history.

(56) References Cited

U.S. PATENT DOCUMENTS

| | | | |
|---|---|---|---|
| 5,162,986 A | 11/1992 | Graber et al. | |
| 5,745,681 A | 4/1998 | Levine et al. | |
| 5,862,325 A | 1/1999 | Reed et al. | |
| 6,088,717 A | 7/2000 | Reed et al. | |
| 6,332,163 B1 | 12/2001 | Bowman-Amuah | |
| 6,415,298 B1 | 7/2002 | Oesterer et al. | |
| 6,434,568 B1 | 8/2002 | Bowman-Amuah | |
| 6,539,396 B1 | 3/2003 | Bowman-Amuah | |
| 6,550,057 B1 | 4/2003 | Bowman-Amuah | |
| 6,813,587 B2 | 11/2004 | McIntyre et al. | |
| 6,986,102 B1 | 1/2006 | Baer et al. | |
| 7,146,524 B2 | 12/2006 | Patel et al. | |
| 7,149,742 B1 * | 12/2006 | Eastham | ........... G06F 17/30575 |
| 8,028,329 B2 | 9/2011 | Whitcomb | |
| 8,230,443 B2 | 7/2012 | Resnick et al. | |
| 8,275,836 B2 | 9/2012 | Beaven et al. | |
| 8,351,600 B2 | 1/2013 | Resch | |
| 8,417,715 B1 | 4/2013 | Bruckhaus et al. | |

(Continued)

FOREIGN PATENT DOCUMENTS

WO      2006016350 A2    2/2006

*Primary Examiner* — Viet D Vu
(74) *Attorney, Agent, or Firm* — Yee & Associates, P.C.

(57) ABSTRACT

A method for accessing information. A computer system receives a request for a piece of the information stored in a location between client computer systems and sources of the information. The information has formats for the information in the location. The formats for the information are controlled by the sources of the information. Each of the sources is assigned to control a group of portions of the information in the location. The computer system identifies the piece of the information corresponding to the request. The computer system returns a response to the request for the piece of the information, enabling simplifying access to the information in different formats.

19 Claims, 10 Drawing Sheets

(56) References Cited

U.S. PATENT DOCUMENTS

| | | | |
|---|---|---|---|
| 8,429,351 B1 | 4/2013 | Yu et al. | |
| 8,468,137 B2 | 6/2013 | Baptist et al. | |
| 8,473,756 B2 | 6/2013 | Orsini et al. | |
| 8,601,025 B1* | 12/2013 | Shajenko | G06F 17/30958 707/720 |
| 8,909,806 B2 | 12/2014 | Bocharov et al. | |
| 2002/0062270 A1* | 5/2002 | Star | G06Q 20/10 705/36 R |
| 2003/0018510 A1 | 1/2003 | Sanches | |
| 2003/0097383 A1 | 5/2003 | Smirnov et al. | |
| 2003/0105887 A1* | 6/2003 | Cox | G06F 8/20 719/328 |
| 2008/0077628 A1* | 3/2008 | Gonzalez | G06F 17/30168 |
| 2008/0168135 A1 | 7/2008 | Redlich et al. | |
| 2010/0010968 A1 | 1/2010 | Redlich et al. | |
| 2010/0138383 A1* | 6/2010 | Winters | G06F 21/6218 707/609 |

* cited by examiner

SUBSCRIPTION-BASED INFORMATION SYSTEM

CROSS-REFERENCE TO RELATED APPLICATIONS

This application is related to the following patent applications: entitled "Information System with Temporal Data," Ser. No. 14/707,408; and entitled "Information System with Versioning," Ser. No. 14/707,451; each filed even date herewith, each assigned to the same assignee, and each incorporated herein by reference in its entirety.

BACKGROUND INFORMATION

1. Field

The present disclosure relates generally to an improved computer system, and in particular, to a method and apparatus for accessing information. Still more particularly, the present disclosure relates to a method and apparatus for accessing information using a subscription based information system.

2. Background

Information systems are used for many different purposes. Many types of information may be located in the information systems for use by an organization.

For example, an information system may have information in the form of payroll information. This payroll information is used to process payroll to generate paychecks for employees in an organization.

Additionally, an information system also may include personnel information used by a human resources department to maintain benefits and other records about employees. For example, a human resources department may manage health insurance, wellness plans, and other programs and organizations using benefits information in the information system. As another example, this type of information may be used to determine when to hire new employees, assign employees to projects, perform reviews for employees, and other suitable operations for the organization.

Further, the information may come from many sources. The sources may be different departments, organizations, or other sources of the information. These sources may also be in different locations. The information from the different sources may be in information systems for the different sources.

Making information available for use by customers may be more difficult than desired. The information in the information systems may be in different formats. These formats may include, for example, the way the information is stored or the amount of information.

For example, payroll information may be received from different locations. These locations may send information for payroll information for states, regions, countries or other locations.

Accessing the payroll information may be more difficult than desired for use in performing operations for an organization. For example, the payroll information may be formatted differently between some or all of the different locations. Different amounts of information may also be present.

For example, payroll information from a first state that has an income tax may include information about state income taxes. Payroll information from a second state that does not have state taxes does not include this information. The number of fields may be different since the first payroll information from one state includes state tax income information and the second payroll information from the other state does not include state income tax information.

As another example, the information received from two states may be the same type of information. The formatting of the information, however, may be different. For example, a currency symbol may be placed before or after the value. Further, the value may or may not have decimal places. As another example, the names of the fields may be different.

Also, in addition to formatting, the type of currency may be different for different locations. Payroll information from locations in the United States is in dollars, while payroll information from the United Kingdom is in pounds. Payroll information from Germany is in Euros.

With this situation, the information from the two states may be more difficult for the consumer to use than desired. For example, the consumer may wish to aggregate the payroll information from the first state and the second state.

The consumer often changes the format of the payroll information from the format as received into one useable by the consumer. For example, when multiple formats for payroll information are present, these formats are converted such that all of the payroll information has the same format. A consumer accessing this payroll information may find this process more difficult than desired.

Therefore, it would be desirable to have a method and apparatus that take into account at least some of the issues discussed above, as well as other possible issues. For example, it would be desirable to have a method and apparatus that overcome the technical problem of information having different formats in an information system.

SUMMARY

An embodiment of the present disclosure provides a method for accessing information. A computer system receives a request for a piece of the information stored in a location between client computer systems and sources of the information. The information has formats for the information in the location. The formats for the information are controlled by the sources of the information. Each of the sources is assigned to control a group of portions of the information in the location. The computer system identifies the piece of the information corresponding to the request. The computer system returns a response to the request for the piece of the information, enabling simplifying access to the information in different formats.

Another embodiment of the present disclosure provides a method for accessing information. A computer system receives a portion of information from a source, wherein the information has formats. The computer system compares the source to an assignment list identifying which ones of sources of the information are assigned to control particular ones of portions of the information. The formats for the information are controlled by the sources of the information. The computer system stores the portion of the information in a location between client computer systems and the sources of the information when the source is assigned to control the portion of the information. The computer system receives a request for the information from a client computer system and sends a response to the client computer system, enabling simplifying access to the information in different formats.

Another embodiment of the present disclosure provides a computer system comprising an information manager. The information manager receives a request for a piece of information stored in a location between client computer systems and sources of the information. The information has formats for the information in the location. The formats for the information are controlled by the sources of the information. Each of the sources is assigned to control a group of portions of the information in the location. The information manager identifies the piece of the information corresponding to the request and returns a response to the request for the piece of the information, enabling simplifying access to the information in different formats.

Yet another embodiment of the present disclosure provides a computer program product for accessing information. The computer program product comprises a computer readable storage media, and first program code, second program code, and third program code stored on the computer readable storage media. The first program code receives a request for a piece of the information stored in a location between client computer systems and sources of the information. The information has formats for the information in the location. The formats for the information are controlled by the sources of the information. Each of the sources is assigned to control a group of portions of the information in the location. The second program code identifies the piece of the information corresponding to the request. The third program code returns a response to the request for the piece of the information, enabling simplifying access to the information in different formats.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that reducing the number of formats for a particular type of information may result in easier access and processing of information by a consumer. The illustrative embodiments also recognize and take into account that the reduction in the number of formats may occur through reducing the number of parties that control formats for a particular type of information that may be accessed by a consumer. A consumer is a person, organization, or entity that may access information using computers or other data processing devices.

Figure 1:
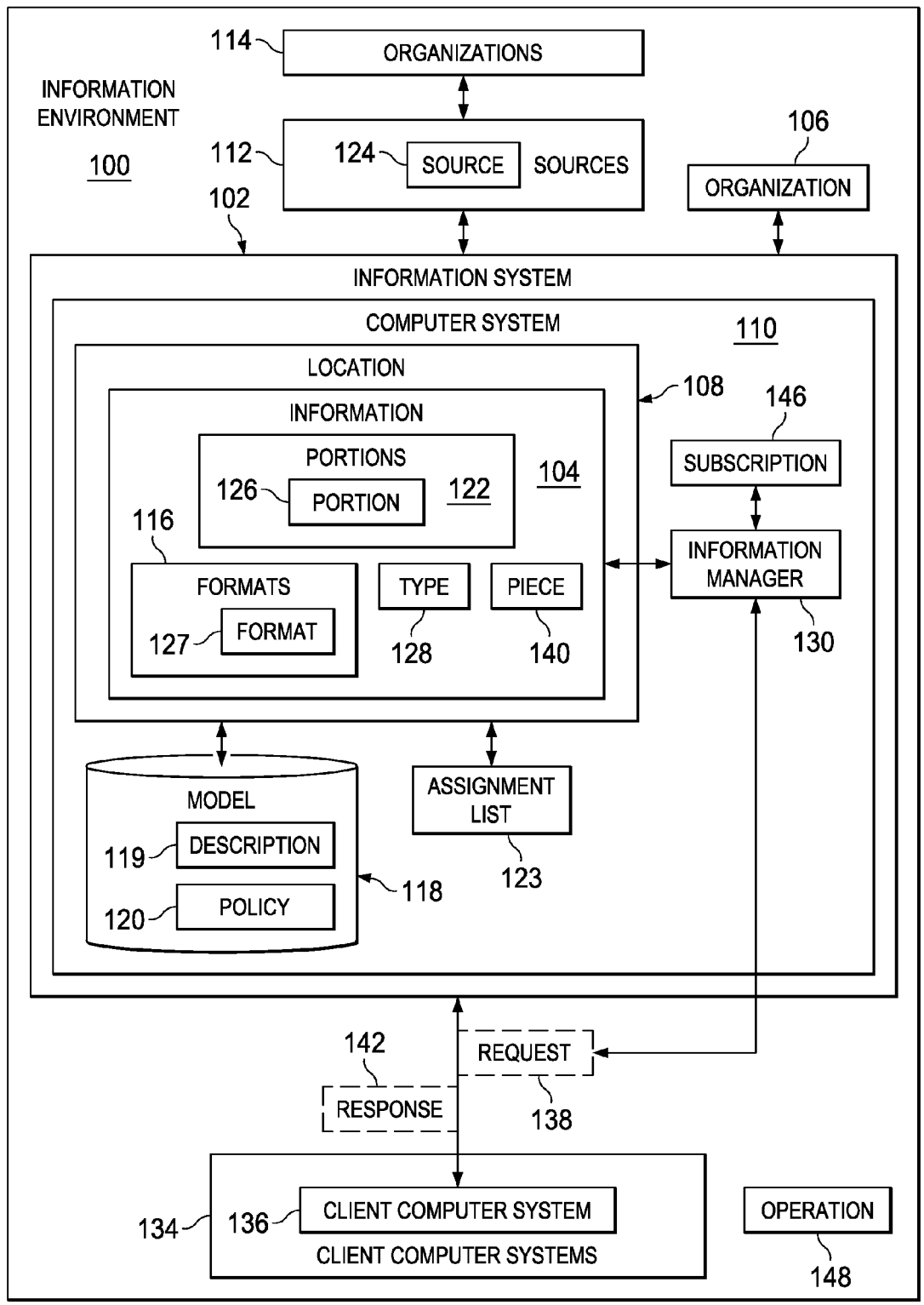
FIG. 1 is an illustration of a block diagram of an information environment in accordance with an illustrative embodiment.

With reference now to the figures, and in particular, with reference to FIG. 1, an illustration of a block diagram of an information environment is depicted in accordance with an illustrative embodiment. In this illustrative example, information environment 100 includes information system 102. Information system 102 manages information 104 about organization 106.

As depicted, information system 102 is used to manage information 104. This management of information 104 may include at least one of writing, modifying, deleting, distributing, partitioning, sharing, assigning ownership, accessing, or otherwise manipulating information 104.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 106 may take various forms. For example, organization 106 may be a company, a charity, an educational group, a social group, a team, a government entity, a group of businesses, or some other suitable organization.

As depicted, information 104 is stored in location 108 in computer system 110. Computer system 110 is a hardware system that includes one or more data processing systems. In this illustrative example, information 104 is stored in one or more data processing systems in location 108 in computer system 110.

When more than one data processing system is present in computer system 110, those data processing systems may be in communication with each other using a communications medium. The communications medium may be a network. The data processing systems may be in more than one location. The data processing systems may be selected from at least one of a computer, a server computer, or some other suitable data processing system for storing information 104 in location 108. Location 108 may be at least one of a computer, a storage system, a hard disk drive system, or some other part of computer system 110 that may store information 104. Location 108 may function as a hub for receiving and distributing information 104.

In this illustrative example, information 104 is received from a group of sources 112. "A group of," as used herein, when used with reference to items, means one or more items. For example, a group of sources 112 is one or more of sources 112.

As depicted, sources 112 are organizations 114 that send information 104 to location 108 in computer system 110. A portion of sources 112 may be part of organization 106 or may belong to organizations 114.

In this illustrative example, information 104 has formats 116. A format is the manner in which information 104 is organized. For example, a format for information 104 may include at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, a language, or other suitable formats that may be used to organize information 104.

In this illustrative example, model 118 is a description of entities and relationships between the entities. As depicted, description 119 in model 118 describes formats 116 for information 104 in location 108. Additionally, model 118 includes policy 120. Policy 120 is a group of rules and also may include information used to apply the group of rules.

In this illustrative example, policy 120 describes how sources 112 may be assigned to a group of portions 122 of information 104. For example, each of sources 112 is assigned to control a group of portions 122 of information 104 based on policy 120 in model 118.

As depicted, assignment list 123 identifies which ones of sources 112 are assigned to particular ones of portions 122. Assignment list 123 is generated when policy 120 is applied to identify the assignment of sources 112 to portions 122.

In the illustrative example, source 124 is assigned to control portion 126 in portions 122. In other words, source 124 controls information 104 in portion 126. As depicted, source 124 decides what information is present in portion 126, format 127 in formats 116 used for information 104 in portion 126, the size of portion 126, when information 104 in portion 126 is updated, and other suitable parameters with respect to portion 126.

In this illustrative example, information 104 present in portion 126 is based on type 128 of information 104. For example, all of information 104 in portion 126 may be information 104 about benefits. Benefits are ones of type 128 of information 104.

Type 128 of information 104 may take different forms. For example, type 128 of information 104 is selected from one of accounting, research, business planning, accounts receivable, accounts payable, sales, marketing, payroll, benefits, taxes, education, or other suitable classifications for information 104.

As depicted, information 104 in location 108 is managed by information manager 130. In this example, information manager 130 may be implemented in software, hardware, firmware, or a combination thereof. When software is used, the operations performed by information manager 130 may be implemented in program code configured to run on hardware, such as a processor unit. When firmware is used, the operations performed by information manager 130 may be implemented in program code and data and stored in persistent memory to run on a processor unit. When hardware is employed, the hardware may include circuits that operate to perform the operations in information manager 130.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, in managing information 104 in location 108, information manager 130 may perform various functions to manage information 104. For example, information manager 130 receives information 104 from sources 112. In particular, information manager 130 may receive information 104 from sources 112 for distribution to client computer systems 134. Information 104 may be received from sources 112 in formats 116 as described by model 118. In other words, information 104 may be placed into formats 116 by sources 112.

Information manager 130 places information 104 into location 108. Information 104 may be distributed to client computer systems 134.

Additionally, information manager 130 also facilitates the control of information 104 by sources 112. For example, information manager 130 may determine which ones of sources 112 may make changes to different ones of portions 122 of information 104. Information manager 130 may determine whether source 124 is allowed to change information 104 in portion 126 when source 124 sends a request to change information 104 in portion 126. This determination is made using assignment list 123, generated using policy 120.

Furthermore, information manager 130 also functions to distribute information 104 as part of managing information 104. In this illustrative example, information manager 130 may distribute information 104 to client computer systems 134. Client computer system 136 in client computer systems 134 is one or more data processing systems. The data processing system may be selected from at least one of a computer, a server computer, a workstation, a laptop computer, a tablet computer, a mobile phone, or some other suitable type of data processing system. Client computer systems 134 are consumers of information 104 in this depicted example.

For example, information manager 130 may receive request 138 from client computer system 136 in client computer systems 134. In this example, request 138 is for piece 140 of information 104.

Information manager 130 identifies piece 140 of information 104 that corresponds to request 138. Information manager 130 returns response 142 to request 138 for information 104 to client computer system 136. In this manner, access to information 104 in different formats may be simplified.

In this illustrative example, client computer systems 134 are aware of formats 116 for portions 122 of information 104. For example, client computer systems 134 may access model 118 and receive description 119 for formats 116. Client computer systems 134 may request description 119 in model 118 from information manager 130 in the illustrative example.

As depicted, client computer systems 134 may be made aware of changes to information 104. Client computer system 136 in client computer systems 134 may register with information manager 130 to obtain subscription 146.

For example, client computer system 136 may subscribe to one or more of portions 122 of information 104 controlled by sources 112. With subscription 146, information manager 130 notifies client computer system 136 subscribing to the group of portions 122 of information 104 of an occurrence of at least one of a change in format for the group of portions 122, an addition of information 104 to the group of portions 122, a deletion of information 104 from the group of portions 122, a modification of information 104 in the group of portions 122, a change of the group of sources 112 controlling the group of portions 122, or some other change to the group of portions 122. In this manner, information system 102 is a subscription-based information system.

Further, subscription 146 may be obtained when client computer system 136 first contacts information manager 130 to access information 104. In this example, subscription 146 results in information manager 130 sending description 119 of format 127 for portion 126 of information 104 to client computer system 136.

Thus, the technical problem of information 104 having different formats in information system 102 is solved through one or more technical solutions in the illustrative examples. In one illustrative example, a technical solution is present in which formats 116 for portions 122 are controlled by a limited number of sources 112. In the depicted example, each portion in portions 122 is controlled by a source in sources 112. Further, each portion has a type of information 104. As a result, when client computer system 136 requests a particular type of information 104 in portion 126, client computer system 136 knows what number of formats 116 to expect for information 104 when obtaining information 104 from portion 126.

In this manner, operation 148 may be performed. Operation 148 may be performed by client computer systems 134, organization 106, organizations 114, or some other suitable type of entity. Thus, portion 126 in portions 122 of information 104 is type 128 of information 104 that may be used to perform operation 148 for organization 106. As depicted, operation 148 may be, for example, hiring, benefits administration, research, forming a team, performing performance evaluations, manufacturing a product, or some other suitable type of operation.

The source controls format or formats used in the portion assigned to the source. As a result, a technical effect in which a reduced number of formats 116 are present for each of portions 122 occurs through reducing the number of sources 112 that control formats 116 for each of portions 122. By having source 124 control portion 126 of information 104, uniformity in formats 116 for portion 126 of information 104 may be achieved.

As a result, computer system 110 operates as a special purpose computer system in which information manager 130 in computer system 110 enables easier access to information 104 by client computer systems 134. The easier access occurs in one illustrative example through assigning control of portions 122 of information 104 to particular ones of sources 112. This assignment is made such that the number of formats 116 that are used in portions 122 is reduced. For example, portion 126 may use format 127 that is controlled by source 124. In this particular example, other ones of sources 112 do not supply portion 126 of information 104. As a result, conflicts with type 128 of information 104 in portion 126 from different formats may be avoided. In particular, information manager 130 transforms computer system 110 into a special purpose computer system as compared to currently available general computer systems that do not have information manager 130.

Computer system 110 in location 108 performs a transformation of information 104. For example, computer system 110 aggregates information 104 from sources 112 into location 108. As depicted, location 108 is between sources 112 and the consumers of information 104, client computer systems 134. In this example, client computer systems 134 may access information 104 more easily from location 108 knowing formats 116. As described above, description 119 of formats 116 may be obtained by client computer systems 134.

Figure 2:
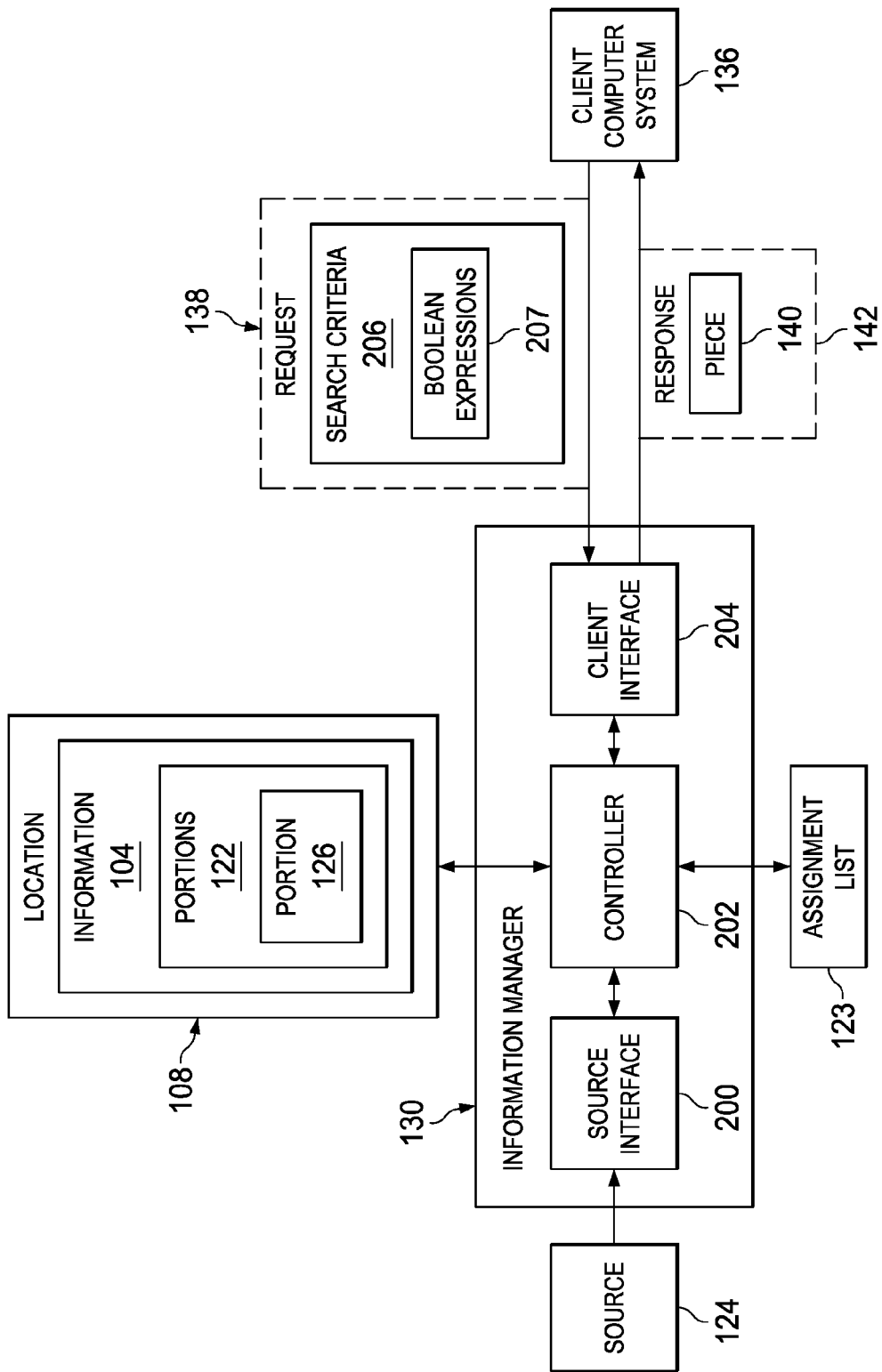
FIG. 2 is an illustration of a block diagram of data flow for accessing information in accordance with an illustrative embodiment.

With reference next to FIG. 2, an illustration of a block diagram of data flow for accessing information is depicted in accordance with an illustrative embodiment. In this figure, an example of data flow for a process for accessing piece 140 of information 104 through information manager 130 is shown. In the illustrative examples, the same reference numeral may be used in more than one figure. This reuse of a reference numeral in different figures represents the same element in the different figures.

In this illustrative example, information manager 130 has a number of different components. As depicted, information manager 130 includes source interface 200, controller 202, and client interface 204. In this illustrative example, each of source interface 200 and client interface 204 is at least one of web services, representational state transfer services, durable queues, or some other suitable type of service interface.

As depicted, controller 202 receives request 138 through client interface 204. In this illustrative example, request 138 includes search criteria 206. Search criteria 206 indicate a group of portions 122 of information 104. As depicted, search criteria 206 may be in the form of a query. For example, the query may be defined using a query by example (QBE) standard.

Search criteria 206 includes a group of boolean expressions 207. The group of boolean expressions 207 are tests for values in the group of portions 122 of information 104. The group of boolean expressions 207 includes at least one of a wild card or text. A wild card indicates matching text is variable for the portion indicated by the wild card. Wild cards in search criteria 206 are selected from at least one of "*", "?", or other suitable types of wild cards.

For example, search criteria 206 may include a boolean expression indicating the name value pair "employee": "*Smith." In this example, search criteria 206 is a request for portions 122 of information 104 indicated by a name value pair with the name "employee" and a value that matches any text that ends with "Smith." For example, when a value for a named value pair with the name "employee" in a portion of the information includes the value "Tom Smith," the portion indicates a match for search criteria 206.

Controller 202 identifies piece 140 of information 104 in location 108 based on search criteria 206. In this illustrative example, location 108 in computer system 110 may organize information 104 in a number of different ways. For example, at least one of a graph database, a relational database, a file system, or some other suitable type mechanism for organizing information 104 may be used.

Controller 202 then generates response 142. In this illustrative example, controller 202 includes piece 140 in response 142. Controller 202 then sends response 142 to client computer system 136 through client interface 204.

Figure 3:
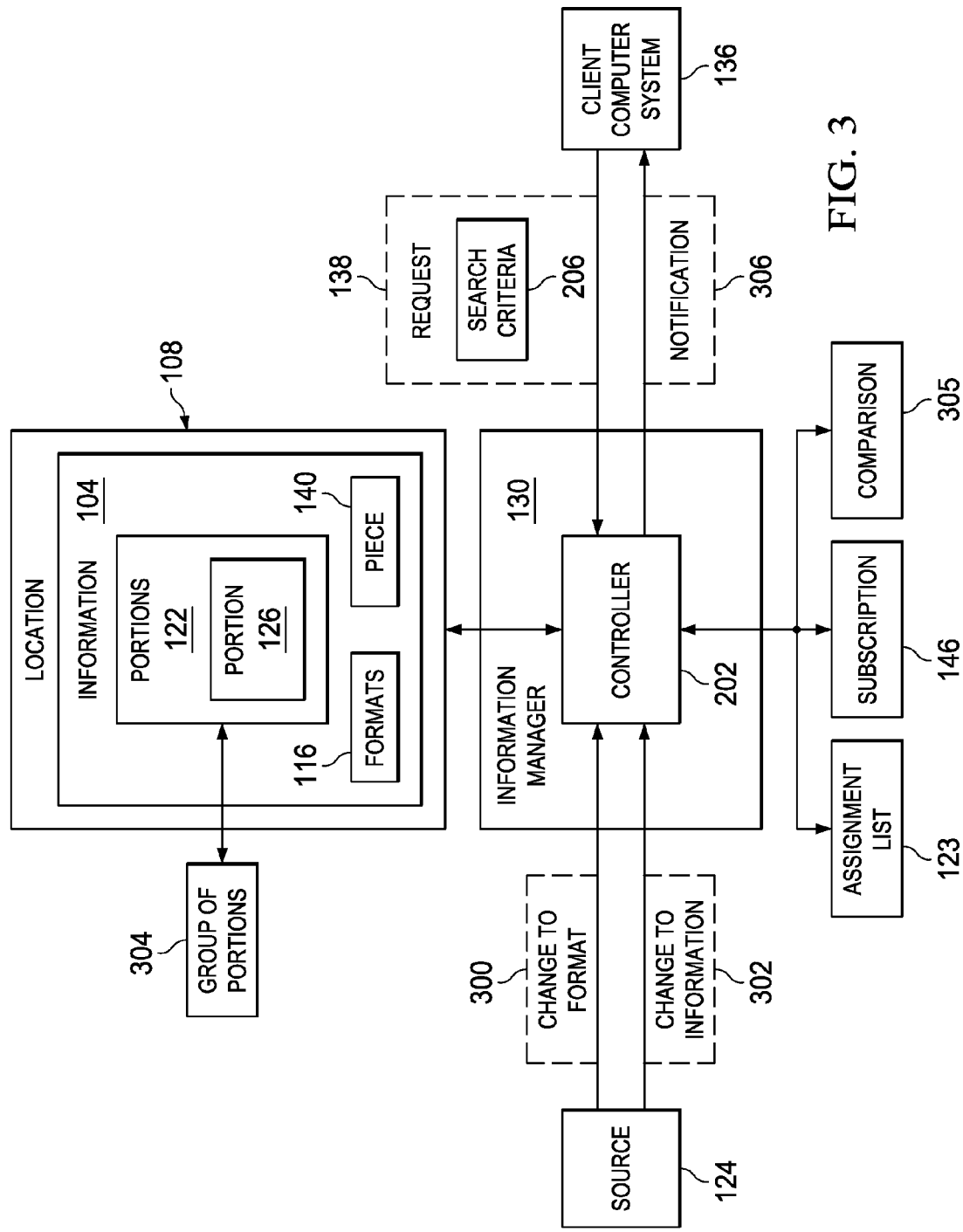
FIG. 3 is an illustration of a block diagram of data flow for processing subscriptions to portions of information in accordance with an illustrative embodiment.

Turning to FIG. 3, an illustration of a block diagram of data flow for processing subscriptions to portions of information is depicted in accordance with an illustrative embodiment. In this figure, an example of data flow for a process for processing subscription 146 through information manager 130 is shown.

In processing subscription 146, controller 202 receives request 138. Request 138 includes search criteria 206. In this illustrative example, controller 202 stores search criteria 206 in subscription 146. Controller 202 stores search criteria 206 in subscription 146 when controller 202 receives request 138.

In this illustrative example, controller 202 receives at least one of change to format 300 for group of portions 304 in portions 122 or change to information 302 for group of portions 304. Change to information 302 is at least one of information for group of portions 304, an addition of additional information for group of portions 304, a modification of information 104 in group of portions 304, or a deletion of information 104 from group of portions 304. Change to format 300 is at least one of an additional format in formats 116 for group of portions 304, modifications to a format in formats 116 for group of portions 304, or a removal of a format in formats 116 for group of portions 304.

Controller 202 compares source 124 to assignment list 123 for group of portions 304. Controller 202 determines whether source 124 is allowed to change group of portions 304 based on the comparison. Controller 202 stores at least one of change to format 300 for group of portions 304 in portions 122 or change to information 302 for group of portions 304 in location 108 when source 124 is allowed to change group of portions 304.

Controller 202 generates comparison 305 between search criteria 206 and the change allowed to group of portions 304. In this illustrative example, comparison 305 is an indication of a match between search criteria 206 and the change allowed to group of portions 304. For example, when search criteria 206 includes a boolean expression indicating the name value pair "accounting data": "*", comparison 305 indicates portions of the change located in accounting data in information 104.

Controller 202 identifies piece 140 of information 104 based on comparison 305. For example, piece 140 may include a portion of the change allowed to group of portions 304.

Controller 202 generates notification 306 when piece 140 of information 104 is identified in comparison 305. In this illustrative example, controller 202 includes at least one of a copy of piece 140, a pointer to piece 140, or other suitable information in notification 306. Controller 202 also includes an indication of at least one of change to format 300 or change to information 302 in notification 306. Controller 202 then sends notification 306 to client computer system 136.

Figure 4:
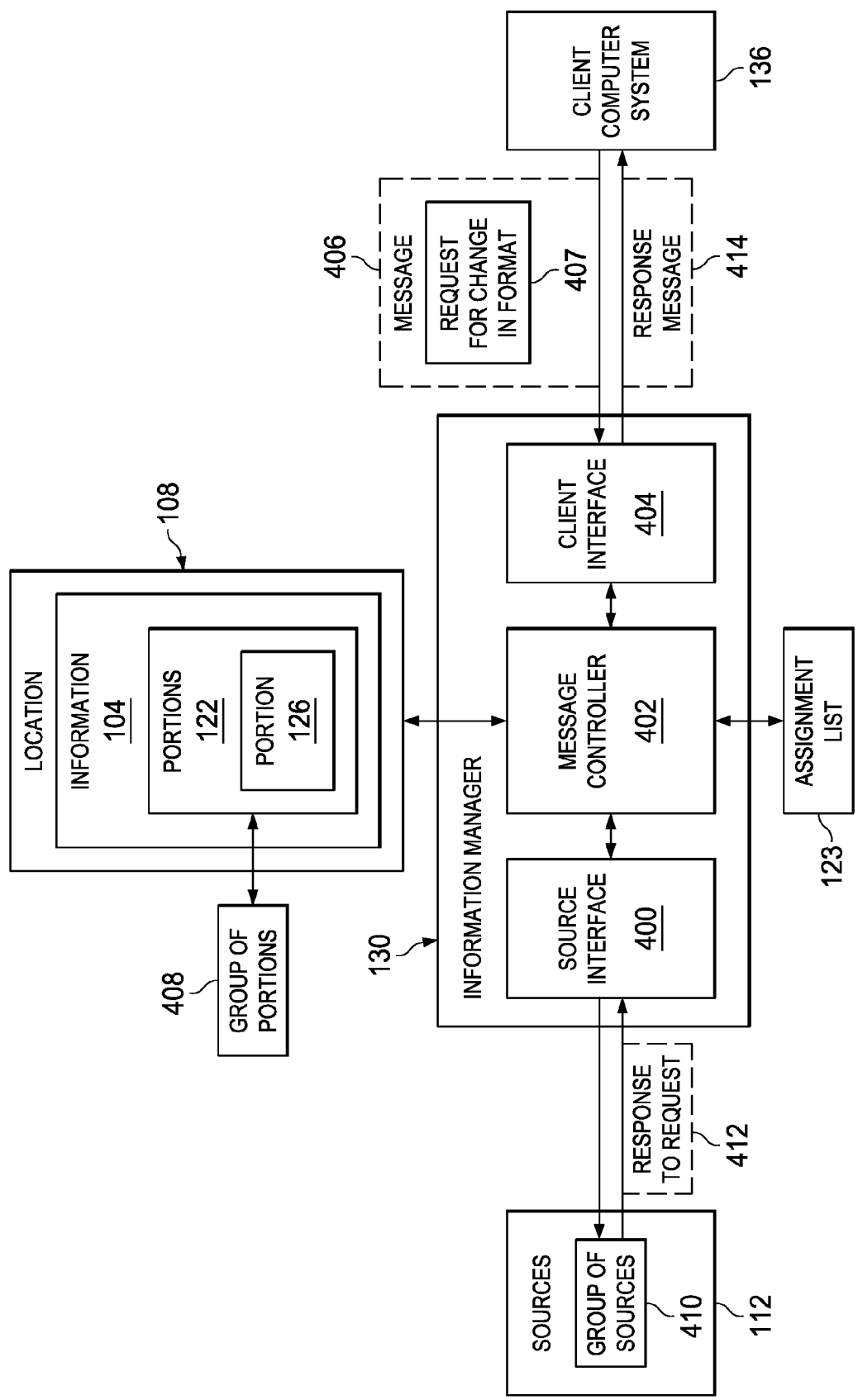
FIG. 4 is an illustration of a block diagram of data flow for managing messages between client computer systems and sources of information in accordance with an illustrative embodiment.

Turning now to FIG. 4, an illustration of a block diagram of data flow for managing messages between client computer systems and sources of information is depicted in accordance with an illustrative embodiment. In this figure, an example of data flow for a process for managing messages through information manager 130 is shown.

In this illustrative example, information manager 130 has a number of different components. As depicted, information manager 130 includes source interface 400, message controller 402, and client interface 404.

As depicted, client interface 404 is at least one of an email service, an instant messaging service, or other suitable type of messaging service. Source interface 400 is at least one of a web service, a representational state transfer service, a durable queue, an email service, an instant messaging service, or other suitable type of service interface.

Message controller 402 receives message 406 from client computer system 136. As depicted, message 406 includes request for change in format 407 for group of portions 408.

Message controller 402 identifies group of sources 410 that own portion 126 based on assignment list 123. Message controller 402 sends group of sources 410 request for change in format 407 through source interface 400.

Message controller 402 receives response to request 412 from group of sources 410. Message controller 402 generates response message 414. Message controller 402 includes an indication of response to request 412 in response message 414. Message controller 402 then sends response message 414 to client computer system 136 through client interface 404.

For example, request for change in format 407 may be a request to change a field in portion 126 from using United States dollar format to Euro format. Request for change in format 407 may also include a request to change the order of fields in portion 126. Request for change in format 407 may further include a request to add additional fields to portion 126.

When these changes are for performing operation 148 in FIG. 1, these changes may save organization 106 time because portion 126 would be closer to what is needed to perform operation 148. In this illustrative example, an employee of organization 106 does not need to know who to talk to in sources 112 to make request for change in format 407 for portion 126.

Figure 5:
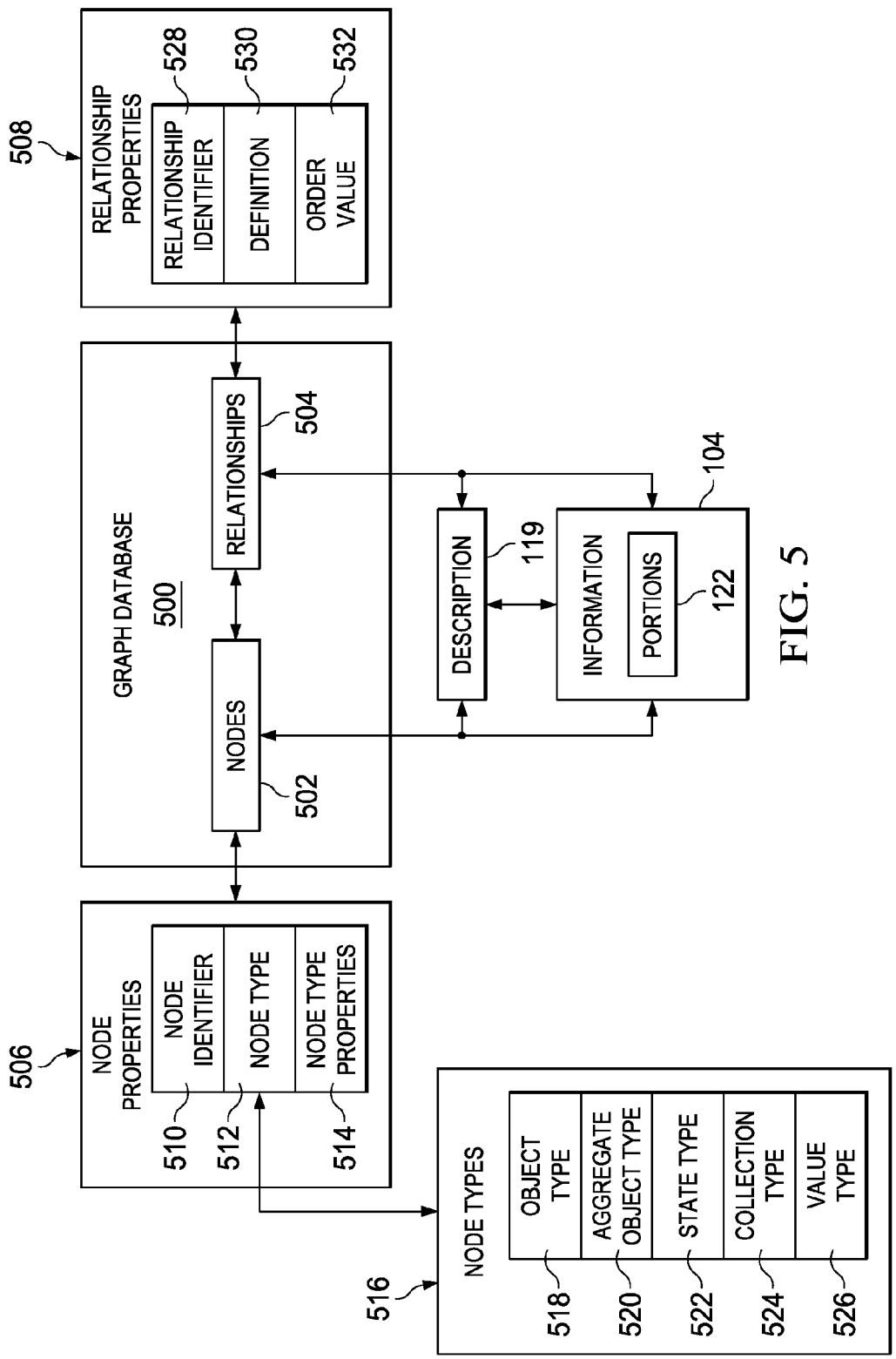
FIG. 5 is an illustration of a block diagram of a graph database in accordance with an illustrative embodiment.

With reference to FIG. 5, an illustration of a block diagram of a graph database is depicted in accordance with an illustrative embodiment. In this illustration, graph database 500 is an example of a data structure that may be used in location 108 in FIGS. 1-4. Graph database 500 may store information 104.

As depicted, graph database 500 includes nodes 502 and relationships 504. In this illustrative example, nodes 502 indicate description 119 of formats 116 for portions 122 of information 104. Nodes 502 also indicate values for portions 122 of information 104. Nodes 502 may represent at least one of accounting, research, business planning, accounts receivable, accounts payable, sales, marketing, payroll, benefits, taxes, education, or other suitable classifications for information 104. As depicted, relationships 504 indicate the relationship between nodes 502.

In this illustrative example, nodes 502 have node properties 506. Additionally, relationships 504 have relationship properties 508.

As depicted, node properties 506 are the properties of nodes 502. These properties of nodes 502 identify description 119 of formats 116 for portions 122 of information 104. These properties also identify values for portions 122 of information. In this illustrative example, node properties 506 include node identifier 510, node type 512, and node type properties 514.

Node identifier 510 points to the node in which node identifier 510 is located. For example, node identifier 510 may be alpha numeric text that identifies the node in graph database 500.

Node type 512 indicates the type of the node in which node type 512 is located. Node type 512 also indicates the type of properties in node type properties 514.

In this illustrative example, node type 512 is selected from at least one of node types 516 or some other suitable type for representing portions 122 of information 104 as nodes 502 in graph database 500. As depicted, node types 516 include object type 518, aggregate object type 520, state type 522, collection type 524, and value type 526.

State type 522 is the node type of a node in nodes 502 for state. State is a group of named values for a portion of information 104.

Object type 518 is the node type of a node in nodes 502 for an object. An object is a data structure that contains data. The data is a portion of the information. For example, when the portion of information includes a name formed by a first name and a last name, the name is an object with the first name and the last name.

As another illustrative example, when the portion of information 104 includes a customer list with names and contact information, the customer list is an object that includes a list of names and contact information. In this example, the contact information may also be an object.

Aggregate object type 520 is an example of node types 516 used for an aggregate object. An aggregate object is an object with a key. The key in an aggregate object is a pointer to the aggregate object for a portion of information. The key is used to access the portion through client interface 204.

Collection type 524 is an example of node types 516. In this illustrative example, collection type 524 is used for a collection. A collection is a sequence of portions of information. The sequence includes at least one of objects, collections, or values.

Value type 526 is an example of node types 516 for a value. This value is a value in a portion of information.

Node type properties 514 indicate at least one of the format or the values of portions 122 of information 104. Node type properties 514 include at least one of attributes, values, references, or other suitable types of properties. For example, a node type property for a node may be at least one of an attribute of the node, a value for the node, or a reference pointing to the node.

In the illustrated example, relationship properties 508 are the properties of relationships 504. These properties are the properties of the relationship between two nodes. As depicted, relationship properties 508 include relationship identifier 528, definition 530, and order value 532.

Relationship identifier 528 points to the relationship in which relationship identifier 528 is located. For example, relationship identifier 528 may be alpha numeric text that identifies the relationship in graph database 500.

As depicted, definition 530 defines the relationship between two nodes. Definition 530 includes pointers to the two nodes. Definition 530 indicates the two nodes are related to each other.

For example, when the first of the two nodes is an object, definition 530 defines a relationship between the object and at least one of another object, a state of the object, a collection of the object, or a value of the object. As another example, when the first node of the two nodes is a collection, definition 530 defines a relationship between the collection and at least one of another collection in the collection, an object in the collection, a group of states in the collection, or a value in the collection.

In this illustrative example, order value 532 is a value specifying relative order of a relationship in a sequence of relationships. For example, the value may be at least one of a number, an alphanumeric sequence of characters, or some other suitable value that indicates order in a sequence of relationships.

Figure 6:
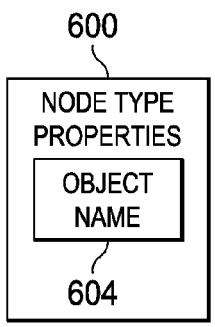
FIG. 6 is an illustration of a block diagram of node type properties for an object in accordance with an illustrative embodiment.

FIGS. 6-10 are illustrative examples of node type properties 514 in FIG. 5. With reference first to FIG. 6, an illustration of a block diagram of node type properties for an object is depicted in accordance with an illustrative embodiment. In this illustrative example, node type properties 600 are an example of node type properties 514 in node properties 506. In this illustration, node type properties 600 are for a node in nodes 502 that represents an object.

As depicted, node type properties 600 includes object name 604. Object name 604 is the name of a portion of information in portions 122 of information 104 in FIGS. 1-5. For example, when description 119 of formats for portions 122 of information 104 is in JavaScript object notation (JSON), the portion is an object that is defined using JavaScript object notation. In this example, object name 604 is the name of the object defined using JavaScript object notation. Description 119 of formats for portions 122 of information 104 may be in a language selected from at least one of extensible markup language (XML), standard generalized markup language (SGML), or some other suitable type of standard for defining formats of information.

Figure 7:
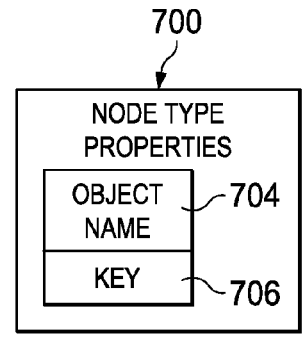
FIG. 7 is an illustration of a block diagram of node type properties for an aggregate object in accordance with an illustrative embodiment.

With reference next to FIG. 7, an illustration of a block diagram of node type properties for an aggregate object is depicted in accordance with an illustrative embodiment. In this illustrative example, node type properties 700 are an example of node type properties 514 in node properties 506 in FIG. 5. In this illustration, node type properties 700 are for a node in nodes 502 that represents an aggregate object.

As depicted, node type properties 700 include object name 704 and key 706. Object name 704 is the name of a portion of information in portions 122 of information 104 in FIGS. 1-5. Key 706 is a name of the portion that may be used to access the portion through client interface 204. For example, key 706 may be a universal resource locator that points to the portion.

Figure 8:
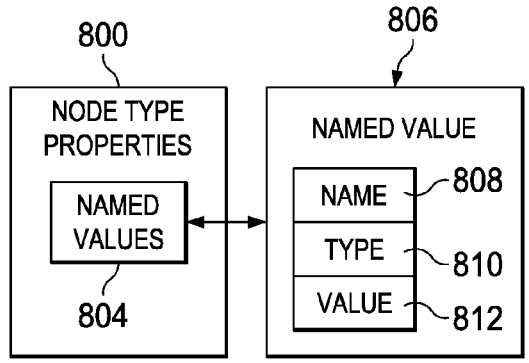
FIG. 8 is an illustration of a block diagram of node type properties for a state in accordance with an illustrative embodiment.

With reference now to FIG. 8, an illustration of a block diagram of node type properties for a state is depicted in accordance with an illustrative embodiment. In this illustrative example, node type properties 800 are an example of node type properties 514 in node properties 506 in FIG. 5. In this illustration, node type properties 800 are for a node in nodes 502 that represents a state.

As depicted, node type properties 800 include a group of named values 804. Named value 806 is an example of a named value in the group of named values 804. Named value 806 includes name 808, type 810, and value 812.

Name 808 is the name of value 812 for a portion of information in portions 122 of information 104 in FIGS. 1-5. Type 810 is the type of value 812. In this illustrated example, type 810 is selected from at least one of string, number, integer, double, Boolean, or some other suitable type of value for the portion.

As depicted, value 812 is the value for the portion of information in portions 122 of information 104 named by name 808. For example, named values 804 may be name value pairs for a portion of information in portions 122 of information 104.

Figure 9:
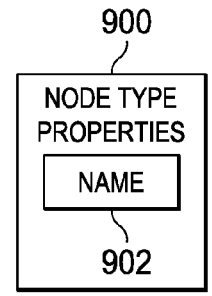
FIG. 9 is an illustration of a block diagram of node type properties for a collection in accordance with an illustrative embodiment.

Turning next to FIG. 9, an illustration of a block diagram of node type properties for a collection is depicted in accordance with an illustrative embodiment. In this illustrative example, node type properties 900 are an example of node type properties 514 in FIG. 5. In this illustration, node type properties 900 are for a collection.

As depicted, node type properties 900 include name 902. Name 902 is the name for an array of at least one of objects, collections, or values for a portion of information in portions 122 of information 104 in FIGS. 1-5.

For example, when description 119 of formats 116 for portions 122 of information 104 is in JavaScript object notation (JSON), this portion is an array that is defined using JavaScript object notation. In this example, name 902 is the name of the array defined using JavaScript object notation.

Figure 10:
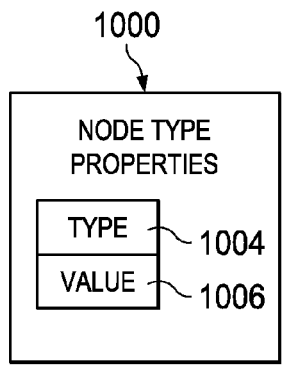
FIG. 10 is an illustration of a block diagram of node type properties for a value in accordance with an illustrative embodiment.

Turning now to FIG. 10, an illustration of a block diagram of node type properties for a value is depicted in accordance with an illustrative embodiment. In this illustrative example, node type properties 1000 are an example of node type properties 514 in FIG. 5. In this illustration, node type properties 1000 are for a value.

As depicted, node type properties 1000 include type 1004 and value 1006. Type 1004 is the type of value 1006 for a portion of information in portions 122 of information 104 in FIGS. 1-5. In this illustrated example, type 1004 is selected from at least one of string, number, integer, double, Boolean, or some other suitable type of value for the portion of information. As depicted, value 1006 is the value for the portion of information.

The illustration of information environment 100 and the different components in FIGS. 1-10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more of sources 112 may be assigned to portion 126 in addition to source 124. For example, two organizations in organizations 114 may have sources 112 that send information 104 to portion 126. Both of these organizations may control format 127 for portion 126. Format 127 is used for all of information 104 in portion 126 in this illustrative example.

In another illustrative example, information 104 may be located in one or more locations in addition to in place of location 108. In other words, information 104 may be stored in a distributed manner.

As another example, at least one of source interface 200 or client interface 204 may be located in controller 202. As still another example, source interface 200 may include a first portion located in source 124 and a second portion located in controller 202.

As a further example, node types 516 may include at least one of additional node types, fewer node types, or different node types. For example, aggregate object type 520 may be removed from node types 516. In this example, key 706 may be at least one of added to node type properties 600 or added as a state in nodes 502.

Figure 11:
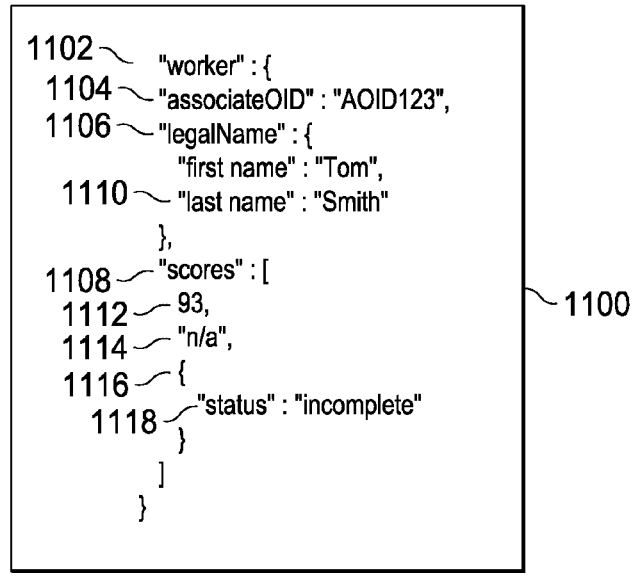
FIG. 11 is an illustration of a portion of information in accordance with an illustrative embodiment.

With reference to FIG. 11, an illustration of a portion of information is depicted in accordance with an illustrative embodiment. In this illustration, portion 1100 is an example of portion 126 in information 104 in FIG. 1. As depicted, portion 1100 is shown in text using JavaScript object notation.

In this illustrative example, portion 1100 is at least one of received from a source in sources 112 or sent to a client computer system in client computer systems 134 in FIG. 1. In this illustrative example, portion 1100 includes object 1102. Object 1102 has the name "worker." Object 1102 includes named value 1104, object 1106, and collection 1108. Named value 1104 indicates "associateOID" has the value "AOID123."

As depicted, object 1106 has the name "legalName." Object 1106 includes named values 1110. Named values 1110 indicate "first name" has the value "Tom" and "last name" has the value "Smith."

Collection 1108 has the name "scores" in this illustrative example. Collection 1108 includes value 1112, value 1114, and object 1116. As depicted, value 1112 is the first item in collection 1108, value 1114 is the second item in collection 1108, and object 1116 is the third item in collection 1108. Value 1112 indicates the first item in collection 1108 has the value "93." Value 1114 indicates the second item in collection 1108 has the value "n/a." Object 1116 includes named value 1118. Named value 1118 indicates "status" has the value "incomplete." Thus, object 1116 indicates the third item in collection 1108 has named value 1118 that indicates "status" has the value "incomplete."

Figure 12:
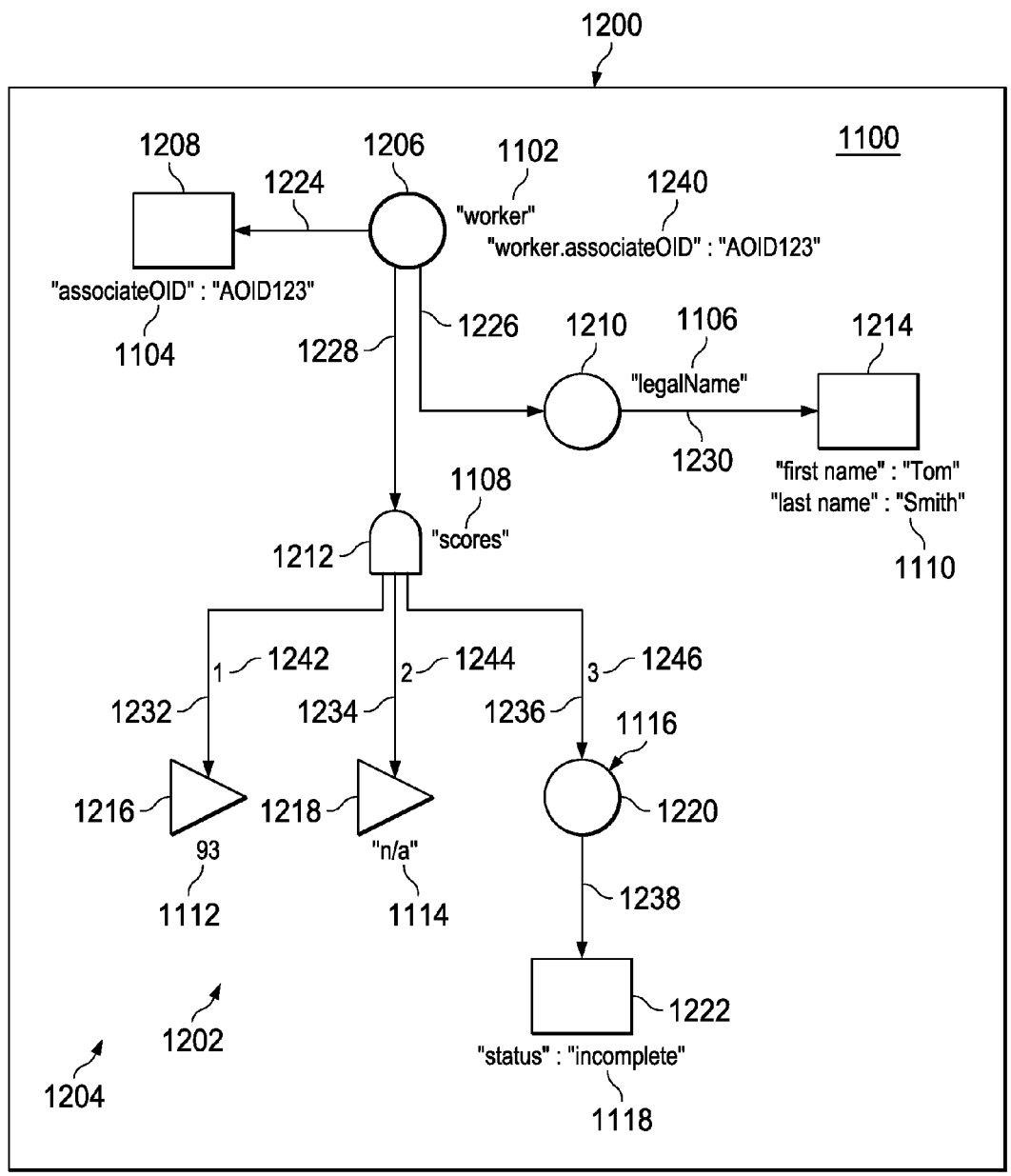
FIG. 12 is an illustration of a graph of information in accordance with an illustrative embodiment.

With reference next to FIG. 12, an illustration of a graph of information is depicted in accordance with an illustrative embodiment. In this illustration, graph 1200 shows nodes 1202 and relationships 1204.

As depicted, nodes 1202 are an example of nodes 502 in graph database 500 and relationships 1204 are an example of relationships 504 in graph database 500 in FIG. 5. In particular, graph 1200 shows where information manager 130 stores portion 1100 of information 104 in graph database 500.

As depicted, nodes 1202 include aggregate object 1206, state 1208, object 1210, collection 1212, state 1214, value 1216, value 1218, object 1220, and state 1222. Aggregate object 1206 is the node in graph database 500 where object 1102 is stored. State 1208 is where named value 1104 is stored. Object 1210 is where object 1106 is stored. Collection 1212 is where collection 1108 is stored. State 1214 is where named values 1110 are stored. Value 1216 is where value 1112 is stored. Value 1218 is where value 1114 is stored. Object 1220 is where object 1116 is stored. State 1222 is where named value 1118 is stored.

In this illustrative example, relationships 1204 include relationship 1224 between aggregate object 1206 and state 1208; relationship 1226 between aggregate object 1206 and object 1210; relationship 1228 between aggregate object 1206 and collection 1212; relationship 1230 between object 1210 and state 1214; relationship 1232 between collection 1212 and value 1216; relationship 1234 between collection 1212 and value 1218; relationship 1236 between collection 1212 and object 1220; and relationship 1238 between object 1220 and state 1222.

Aggregate object 1206 includes key 1240. Key 1240 is an example of key 706 in node type properties 700 in FIG. 7. In this illustrated example, key 1240 is a named value. Key 1240 indicates "worker.associateOID" has the value "AOID123." Aggregate object 1206 may be accessed through client interface 204 with key 1240.

As depicted, relationship 1232 has value 1242, relationship 1234 has value 1244, and relationship 1236 has value 1246. Value 1242, value 1244, and value 1246 are examples of order value 532 in relationship properties 508 in FIG. 5. In this illustrative example, value 1242 in relationship 1232 indicates value 1216 is the first item in collection 1212; value 1244 in relationship 1234 indicates value 1218 is the second item in collection 1212; and value 1246 in relationship 1236 indicates object 1220 is the third item in collection 1212.

Figure 13:
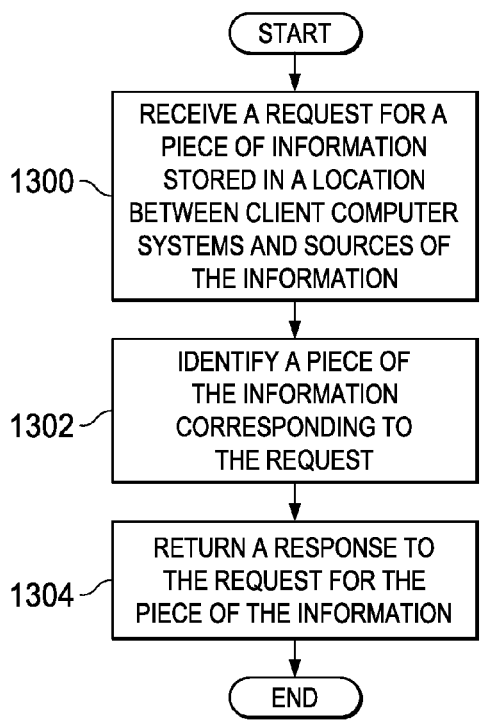
FIG. 13 is an illustration of a flowchart of a process for accessing information in accordance with an illustrative embodiment.

Turning next to FIG. 13, an illustration of a flowchart of a process for accessing information is depicted in accordance with an illustrative embodiment. The process illustrated in FIG. 13 may be implemented in information environment 100 in FIG. 1. In particular, the process may be implemented in information manager 130 in computer system 110.

The process begins by receiving a request for a piece of information stored in a location between client computer systems and sources of the information (step 1300). In step 1300, the information has formats for the information in the location and the formats for the information are controlled by the sources of the information. Also, each of the sources is assigned to control a group of portions of the information in the location.

The process identifies a piece of the information corresponding to the request (step 1302). The process returns a response to the request for the piece of the information (step 1304), with the process terminating thereafter. The process includes a technical solution to information having different formats and enables simplifying access to the information in different formats.

Figure 14:
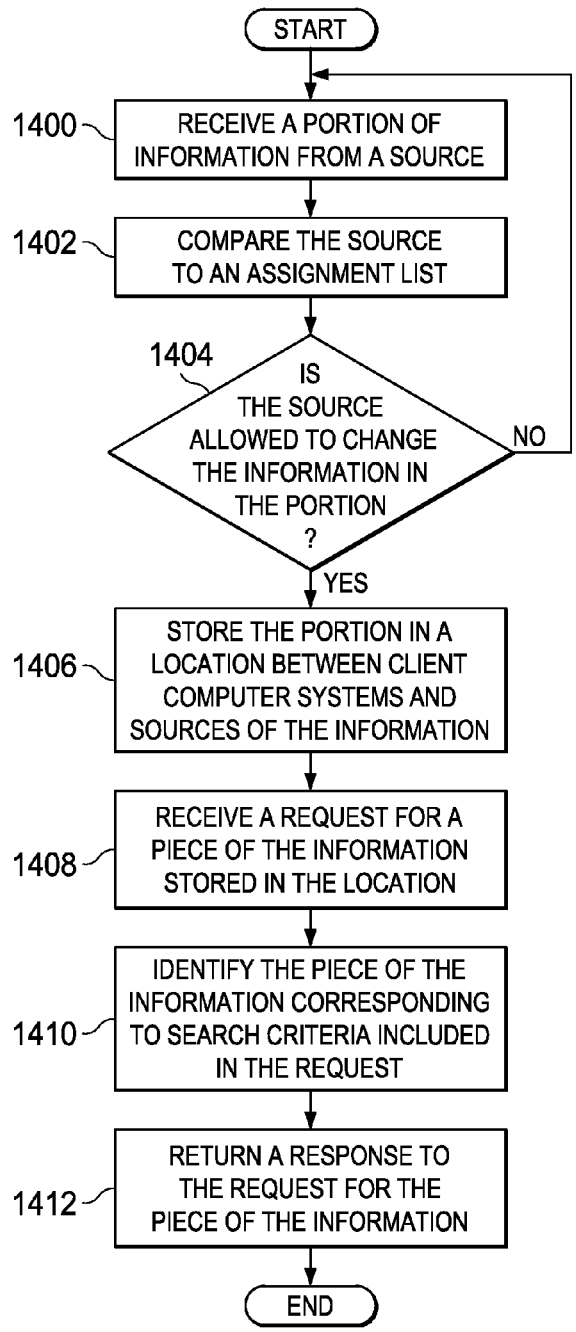
FIG. 14 is an illustration of a flowchart of a process for accessing information in accordance with an illustrative embodiment.

With reference to FIG. 14, an illustration of a flowchart of a process for accessing information is depicted in accordance with an illustrative embodiment. The process illustrated in FIG. 14 may be implemented in information environment 100 in FIG. 1. In particular, the process may be implemented in information manager 130 in computer system 110. These components may follow the data flow described in FIG. 2.

The process begins by receiving a portion of information from a source (step 1400). The process compares the source to an assignment list (step 1402). A determination is made as to whether the source is allowed to change the information in the portion (step 1404). If the source is not allowed to change the information in the portion, the process returns to step 1400.

As depicted, if the source is allowed to change information in the portion, the process stores the portion in a location between client computer systems and sources of the information (step 1406). The process next receives a request for a piece of the information stored in the location (step 1408).

The process identifies the piece of the information corresponding to search criteria included in the request (step 1410). The process returns a response to the request for the piece of the information (step 1412), with the process terminating thereafter.

Figure 15:
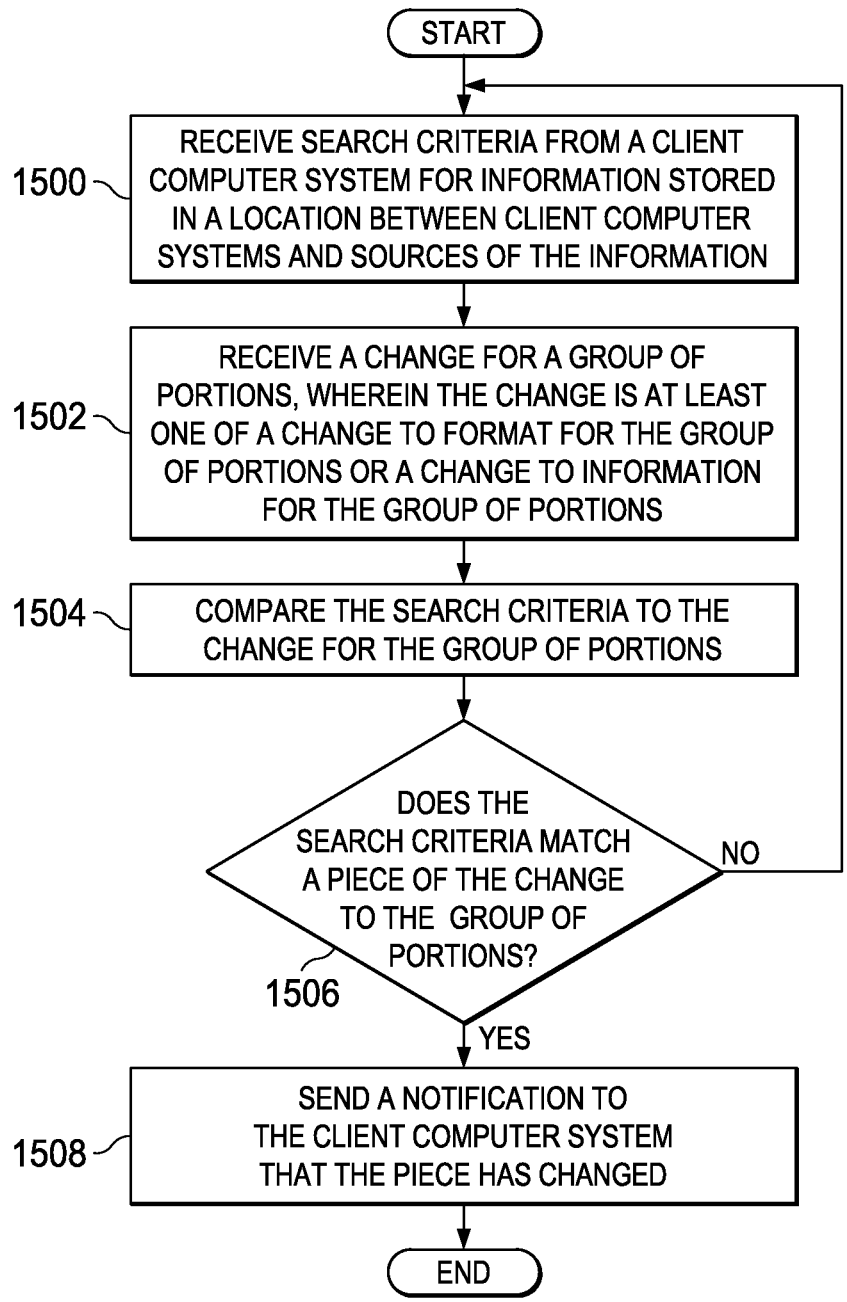
FIG. 15 is an illustration of a flowchart of a process for processing subscriptions in accordance with an illustrative embodiment.

With reference next to FIG. 15, an illustration of a flowchart of a process for processing subscriptions is depicted in accordance with an illustrative embodiment. The process illustrated in FIG. 15 may be implemented in information environment 100 in FIG. 1. In particular, the process may be implemented in information manager 130 in computer system 110. These components may follow the data flow described in FIG. 3.

The process begins by receiving search criteria from a client computer system for information stored in a location between client computer systems and sources of the information (step 1500). When the process receives the search criteria, the process may also receive a group of portions of the information to be sent to the client computer system when the search criteria is met.

The process next receives a change for a group of portions, wherein the change is at least one of a change to format for the group of portions or a change to information for the group of portions (step 1502). The process compares the search criteria to the change for the group of portions (step 1504). The process makes a determination of whether the search criteria matches a piece of the change to the group of portions (step 1506). If the search criteria do not match the piece of the change, the process returns to step 1500.

As depicted, when the search criteria matches the piece of the change, the process sends a notification to the client computer system that the piece has changed (step 1508), with the process terminating thereafter. The notification may include a copy of the group of portions of information requested to be sent to the client computer system when the search criteria is met.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 14 may perform steps 1400, 1402, 1404, and 1406 substantially concurrently with steps 1408, 1410, and 1412. In this example, the process processes the portion of information received from the source and the request from the client computer system substantially concurrently. As another example, the process in FIG. 14 may include an additional step to notify the source when the process has determined that the source is not allowed to change information in the portion.

Figure 16:
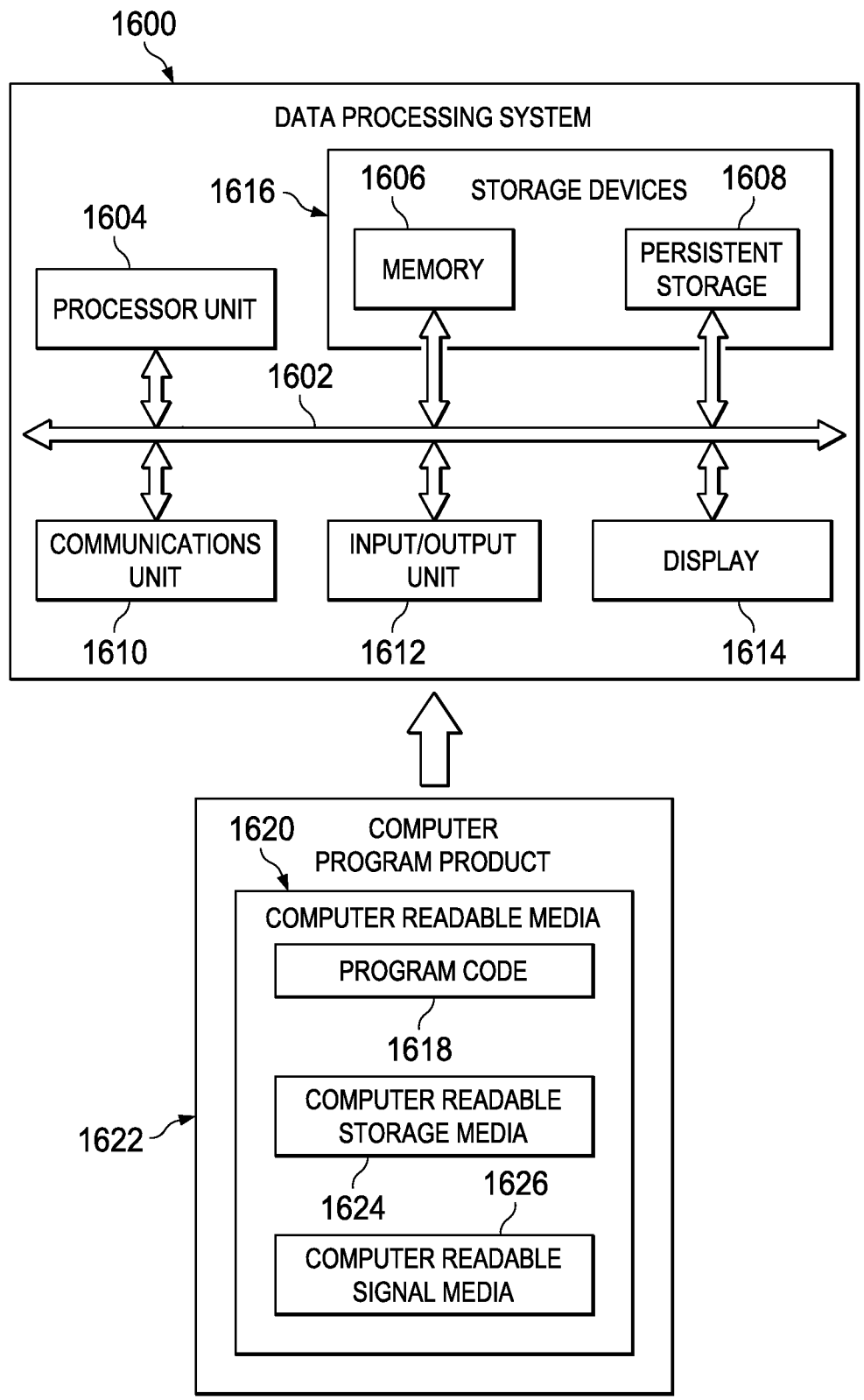
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement computer system 110 and client computer systems 134. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these illustrative examples. In one example, computer readable media 1620 may be computer readable storage media 1624 or computer readable signal media 1626.

In these illustrative examples, computer readable storage media 1624 is a physical or tangible storage device used to store program code 1618 rather than a medium that propagates or transmits program code 1618. Alternatively, program code 1618 may be transferred to data processing system 1600 using computer readable signal media 1626. Computer readable signal media 1626 may be, for example, a propagated data signal containing program code 1618. For example, computer readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

Thus, the technical problem of information having different formats in an information system is solved through one or more technical solutions in the illustrative examples. In one illustrative example, a technical solution is present in which formats for a portion of the information are controlled by a limited number of sources 112.

In one illustrative example, each portion of the information is controlled by a source. By limiting the number of sources that control a portion of the information, the format for information in a particular portion of the information may be consistent throughout the information in that portion. As a result, access to the information may be simplified. For example, consumers of information may need to perform less reformatting of a portion of the information when the formatting is controlled by a single source.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for accessing information, the method comprising:
    receiving, by a computer system, a portion of the information for distribution to client computer systems, wherein the portion of the information is received from a source and has formats for the portion of the information, wherein formats for the portion of the information are controlled by the source of the portion of the information;
    placing, by the computer system, the portion of the information into a graph database at a location that is between the client computer systems and the source of the portion of the information, wherein placing the portion of the information comprises storing the portion of the information within a set of nodes indicating formats for the portion of the information and values for the portion of the information;
    assigning, by the computer system, control of the portion of the information to the source;
    generating, by the computer system, an assignment list indicating that the portion of the information is assigned to source;
    receiving, by a computer system, a request from the source to change a piece of the information stored in the location, wherein the change is at least of one a change in a format for the portion, an addition of additional information to the portion, a deletion of the information from the portion, a modification of the information in the portion, or a change of a source controlling the portion;
    identifying, by the computer system, the piece of the information in the location;
    determining, by the computer system, whether the source is allowed to change the piece of the information by comparing the source to the assignment list;
    in response to determining that the source is allowed to change the piece of the information, storing the change in the portion of the information controlled by the source;
    returning, by the computer system, a response to the request for the piece of the information, enabling simplifying access to the information in different formats; and
    notifying, by the computer system, a client computer system subscribing to the portion of the information of an occurrence of the change to the portion of the information.

2. The method of claim 1, wherein receiving the information from the sources for distribution to the client computer systems comprises:
    receiving, by the computer system, the information from the sources for distribution to the client computer systems in the formats.

3. The method of claim 1, wherein the source of the portion of the information is allowed to change the information in the portion and other sources not assigned to the portion are not allowed to change the information in the portion.

4. The method of claim 3 further comprising:
    receiving, by the computer system, a request from the client computer system for a change to the format for the portion of the information;
    sending, by the computer system, the request to the source;
    receiving, by the computer system, a response to the request from the source; and
    sending, by the computer system, the response to the client computer system.

5. The method of claim 1 further comprising:
    assigning, by the computer system, the sources to the portions of the information based on a policy.

6. The method of claim 1, wherein the location includes the graph database and the portions of the information are stored as nodes in the graph database.

7. The method of claim 1, wherein a portion in the portions of the information is a type of the information that is used to perform an operation for an organization.

8. The method of claim 7, wherein the type is selected from one of accounting, research, business planning, accounts receivable, accounts payable, sales, marketing, payroll, benefits, taxes, or education.

9. The method of claim 1, wherein the client computer systems and the sources communicate with the location through at least one of representational state transfer services or durable queues.

10. A method for accessing information, the method comprising:
    receiving, by a computer system, a portion of information from a source, wherein the information has formats;
    comparing, by the computer system, the source to an assignment list identifying which ones of sources of the information are assigned to control particular ones of portions of the information, wherein the formats for the information are controlled by the sources of the information, wherein the assignment list indicates which ones of the sources are allowed to change the portion of the information;
    in response to determining that the source is allowed to change the piece of the information, storing, by the computer system, the portion of the information in a graph database at a location between client computer systems and the sources of the information when the source is assigned to control the portion of the information, wherein placing the portion of the information comprises storing the portion of the information within a set of nodes indicating formats for the portion of the information and values for the portion of the information, wherein the computer system receives a request for the information from a client computer system and sends a response to the client computer system, enabling simplifying access to the information in different formats; and
    notifying, by the computer system, a client computer system subscribing to the portion of the information of an occurrence of at least of one a change in a format for the portion, an addition of additional information to the portion, a deletion of the information from the portion, a modification of the information in the portion, or a change of a source controlling the portion.

11. A computer system comprising:
    an information manager that: receives a portion of the information for distribution to client computer systems, wherein the portion of the information is received from a source and has formats for the portion of the information, wherein formats for the portion of the information are controlled by the source of the portion of the information; places the portion of the information into a graph database at a location that is between the client computer systems and the source of the portion of the information, wherein placing the portion of the information comprises storing the portion of the information within a set of nodes indicating formats for the portion of the information and values for the portion of the information; assigns control of the portion of the information to the source; generates an assignment list indicating that the portion of the information is assigned to source; receives a request from the source to change a piece of the information stored in the location, wherein the change is at least of one a change in a format for the portion, an addition of additional information to the portion, a deletion of the information from the portion, a modification of the information in the portion, or a change of a source controlling the portion; identifies the piece of the information corresponding to the request; determines whether the source is allowed to change the piece of the information by comparing the source to the assignment list; in response to determining that the source is allowed to change the piece of the information, stores the change in the portion of the information controlled by the source; returns a response to the request for the piece of the information, enabling simplifying access to the information in different formats; and notifies a client computer system subscribing to the portion of the information of an occurrence of the change to the portion of the information.

12. The computer system of claim 10, wherein in receiving the information from the sources for distribution to the client computer systems, the information manager receives the information from the sources for distribution to the client computer systems in the formats.

13. The computer system of claim 10, wherein the source of the portion of the information is allowed to change the information in the portion and other sources not assigned to the portion are not allowed to change the information in the portion.

14. The computer system of claim 13, wherein the information manager receives the request from the client computer system for a change to a format for the portion of the information; sends the request to the source; receives the response to the request from the source; and sends the response to the client computer system.

15. The computer system of claim 11, wherein the information manager assigns the sources to the portions of the information based on a policy.

16. The computer system of claim 11, wherein the location includes a graph database and the portions of the information are stored as nodes in the graph database.

17. A computer program product for accessing information, the computer program product comprising:
a computer readable storage media;
program code, stored on the computer readable storage media, for receiving a portion of the information for distribution to client computer systems, wherein the portion of the information is received from a source and has formats for the portion of the information, wherein formats for the portion of the information are controlled by the source of the portion of the information;
program code, stored on the computer readable storage media, for placing the portion of the information into a graph database at a location that is between the client computer systems and the source of the portion of the information, wherein placing the portion of the information comprises storing the portion of the information within a set of nodes indicating formats for the portion of the information and values for the portion of the information;
program code, stored on the computer readable storage media, for assigning control of the portion of the information to the source;
program code, stored on the computer readable storage media, for generating an assignment list indicating that the portion of the information is assigned to source;
program code, stored on the computer readable storage media, for receiving a request from the source to change a piece of the information stored in the location, wherein the change is at least of one a change in a format for the portion, an addition of additional information to the portion, a deletion of the information from the portion, a modification of the information in the portion, or a change of a source controlling the portion;
program code, stored on the computer readable storage media, for identifying the piece of the information corresponding to the request;
program code, stored on the computer readable storage media, for determining whether the source is allowed to change the piece of the information by comparing the source to the assignment list;
program code, stored on the computer readable storage media, for storing the change in the portion of the information controlled by the source in response to determining that the source is allowed to change the piece of the information;
program code, stored on the computer readable storage media, for returning a response to the request for the piece of the information, enabling simplifying access to the information in different formats; and
program code, stored on the computer readable storage media, for notifying the client computer system subscribing to the portion of the information of an occurrence of the change to the portion of the information.

18. The computer program product of claim 17 further comprising:
program code, stored on the computer readable storage media, for receiving the information from the sources for distribution to the client computer systems in the formats.

19. The computer program product of claim 17 further comprising:
program code, stored on the computer readable storage media, for receiving the request from the client computer system for a change to a format for a portion of the information;
program code, stored on the computer readable storage media, for sending the request to a source;
program code, stored on the computer readable storage media, for receiving a response to the request from the source; and
program code, stored on the computer readable storage media, for sending the response to the client computer system.

* * * * *